Nov. 23, 1937.　　　　M. H. PERRY　　　　2,100,266
OIL FILTER
Filed Sept. 14, 1936
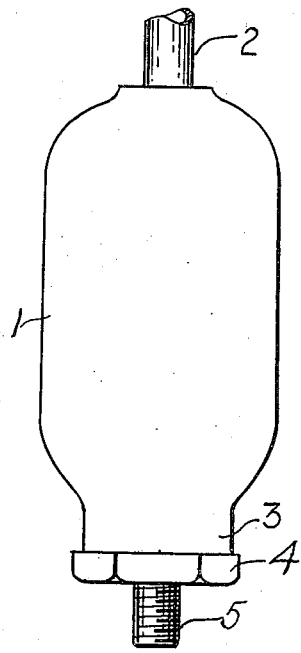
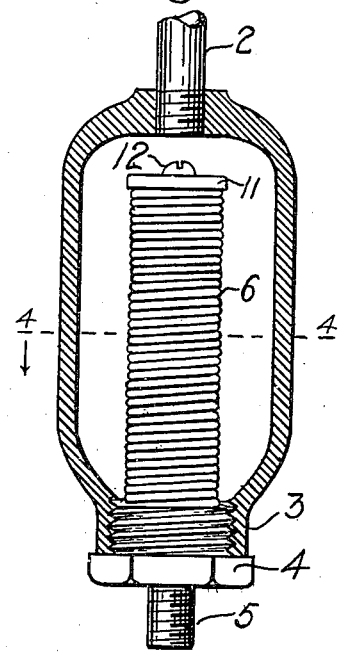
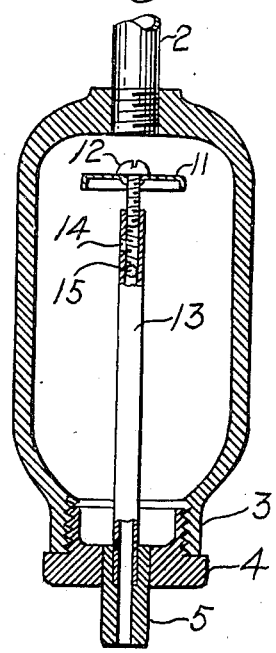
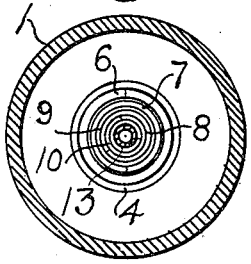
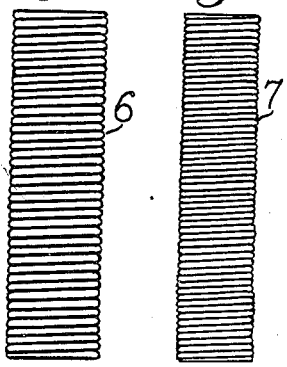
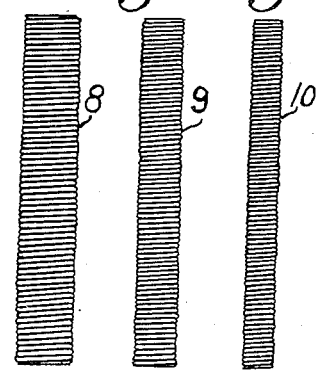
Inventor
Milton H. Perry.
By Edwin Guthrie
Attorney Patented Nov. 23, 1937

2,100,266

UNITED STATES PATENT OFFICE 2,100,266

OIL FILTER

Milton H. Perry, Lansing, Mich.

Application September 14, 1936, Serial No. 100,753

1 Claim. (Cl. 210—169)

This invention relates to oil filters, more generally, to the filtration of liquids or gases or to any similar uses to which it may be applied.

The object of this invention is to provide a filter comprising a plurality of spring coils of wire or the like, the coils being of different sizes and arranged one within another as illustrated and described herein.

The experience of this applicant indicates that to filter oil to a fine degree, the flow must be more or less retarded. Screening only is not filtering in the sense desired and intended in the use of this invention. Running oil through a screen that would take care of the capacity of a pump is not filtering according to the meaning of this application. In all motor plant filters, with which the applicant is familiar, filters are not located on the main lines from the oil pumps to the bearings. This would be very unsatisfactory and even dangerous to the bearings in case the filter became clogged. Therefore, in the arrangement of all motor systems the filters are placed on the by-pass, such as coming off the gauge line, or anywhere off the pump, so that the oil going through the filter has nothing whatsoever to do with the oil supply to the motor. In that arrangement, filtering from the by-pass and returning to the crank case affords an opportunity to retard or check the flow by the resistance of the filter, and to take filtering oil through slowly and return it back to the crank case without interference with the supply directed to the motor. The amount of oil pumped over and over on the bearings may reach a considerable number of gallons during a day's run of an automobile or stationary engine. Applicant believes that a filter that turned the oil in the crank case only once during a day's run would be a much better and finer filter than one which would put the oil through ten times or more. It is well known that 8% to 10% of all cylinder oil becomes sludge or foul matter before it is used up. That is to say, the oil is better after use if it can be cleaned and the pollution removed as proposed by applicant. The use of this invention in any motor system puts the oil into a finer state, breaking up the globules and working them into a size and uniform character, resulting in a much more effective lubricant.

The construction of a filter in accordance with this invention is such that in use the oil is passed through it under pressure very slowly. With the housing or casing outside the springs, and particularly the construction and arrangement of the springs, the sludge is entirely removed with other impurities in the oil, which settle to the bottom of the housing and the series of springs. By constantly passing the oil through, there is picked up all the water, grit, wax etc., which is collected in the lower part of the filter, thus keeping the oil in the crank case clean and free from sludge. This result would not be accomplished with a rush of oil on the main line through the bearings, in an arrangement where the motor would have to depend entirely upon the flow of oil directly through the filter. It is the experience of applicant that there is no superior material with which to purify oil than the waste that clings more or less to the coils of this invention which the filtering oil has to pass through. This makes a very fine degree of filtration. In fact, the filter constructed in accordance with this invention is much more efficient when it has accumulated an amount of debris than it is when all washed out and perfectly clean. The cleaning periods for washing out and cleaning the filter herein set forth are governed entirely by the size of the filter. For the size of the filter illustrated in the drawing accompanying this application it is recommended that it be cleaned every two thousand miles over which the automobile may be driven, so that the waste will not build up, or plug up the filter completely, thus terminating its usefulness for the time being.

It has been determined by experiment, that the adjusting screw which secures the cap mentioned upon the top of the coil series, is not absolutely necessary. In fact, it may be operated by persons without familiarity with the invention to put the whole out of adjustment. Therefore, this invention is not to be limited to the inclusion of the adjusting means, but the series of springs and deposit spaces may be built and ground to the right adjustment in the first instance in the manufacture of the invention. The only use for the upper screw would then be for taking the filter apart in the process of cleaning it.

Of the drawing forming a part of this application for Letters Patent, Fig. 1 represents an outside view of all parts assembled.

Fig. 2 is a vertical section of the housing or casing, showing the position of the springs therein.

Fig. 3 is a vertical sectional view of the casing with the springs omitted, showing the axial discharge tube and its connections.

Fig. 4 is a cross-section taken on the broken line 4—4 of Fig. 2.

Figs. 5, 6, 7, 8, and 9 represent vertical external views of the coils, showing their different thickness or diameters.

Throughout the drawing and description the same number is used to refer to the same part.

Considering the drawing, a housing or casing 1 of any desired form or size, has an inlet opening 2, and a throat 3 usually threaded and closed by the removable screw plug or cap 4. The plug may be provided with an outlet pipe 5 through which is formed an outlet passage as shown. Usually there are five coils, 6, 7, 8, 9, and 10, arranged one within another. The coils are of different size wire, and the coils may alternate right and left turns in order that there may be no direct by-pass or straight travel of the liquid. This alternation will put the liquid into a whirl and there will be a retardation as it passes, and gives the foreign matter, sludge and muck such as is found in all oil, a chance to settle to the bottom of the casing or housing. It is not intended to limit the invention to any particular number or disposition of coils, or size or shape of wire, or to the space between the coils, or interval between the wires of the same coil.

In Figs. 2 and 3 is shown a cap 11 secured by a screw 12 upon the tops of the spring column, thus closing the tops of the springs. Screw 12 engages threads in the upper end of an axial discharge tube 13, and if desired, pressure may be exerted upon the springs by means of the cap and screw. Tube 13 has its lower end in communication with the outlet passage of the plug 4 as illustrated, and the tube is further provided with any number of openings 14 and 15 in any selected positions to admit filtered fluid from the coils into the tube.

The operation of this invention is believed to have been fully brought out in the foregoing explanation.

Having described this invention and its use, I claim:

In a fluid filter, the combination with a casing having an outlet tube, an inlet tube arranged axially in the casing and provided with perforations, a series of coils of wire arranged around said inlet tube, said coils being placed one within another, the outermost of said coils being formed of wire greatest in thickness, the innermost coils being formed of wire least in thickness in said series, and the said inlet tube having a top provided with a screw engaging the inlet tube for closing the tops of the coils.

MILTON H. PERRY.